United States Patent
Lin

(10) Patent No.: US 11,016,841 B2
(45) Date of Patent: May 25, 2021

(54) METHODS AND APPARATUSES FOR PROACTIVE ECC FAILURE HANDLING

(71) Applicant: Silicon Motion, Inc., Zhubei (TW)

(72) Inventor: Sheng-Liu Lin, Hsinchu (TW)

(73) Assignee: SILICON MOTION, INC., Zhubei (TW)

(*) Notice: Subject to any disclaimer, the term of this patent is extended or adjusted under 35 U.S.C. 154(b) by 272 days.

(21) Appl. No.: 16/034,915

(22) Filed: Jul. 13, 2018

(65) Prior Publication Data
US 2019/0095274 A1  Mar. 28, 2019

Related U.S. Application Data

(60) Provisional application No. 62/563,115, filed on Sep. 26, 2017.

(30) Foreign Application Priority Data

Mar. 16, 2018  (TW) .................... 107109044

(51) Int. Cl.
*G06F 11/10* (2006.01)
*G06F 3/06* (2006.01)
*G06F 12/02* (2006.01)

(52) U.S. Cl.
CPC .......... *G06F 11/102* (2013.01); *G06F 3/0659* (2013.01); *G06F 11/1044* (2013.01);
(Continued)

(58) Field of Classification Search
CPC .......... G06F 12/0246; G06F 11/1068; G06F 3/0659; G06F 3/0679; G06F 2212/7201; G06F 2212/403
See application file for complete search history.

(56) References Cited

U.S. PATENT DOCUMENTS 10,331,600 B1* 6/2019 Rajadnya ............ G06F 13/1673
2015/0254129 A1* 9/2015 Authement ............ G11C 29/52
714/704
(Continued)

FOREIGN PATENT DOCUMENTS

TW  201003657 A  1/2010
TW  201506674 A  2/2015
(Continued)

OTHER PUBLICATIONS

Taiwanese Office Action and Search Report, dated Mar. 18, 2019, for Taiwanese Application No. 107109044, with an English transation.

*Primary Examiner* — Jigar P Patel

(74) *Attorney, Agent, or Firm* — Birch, Stewart, Kolasch & Birch, LLP

(57) ABSTRACT

The invention introduces a method for proactive error-correcting code (ECC) failure handling, at least including the following steps: obtaining a completion element (CE) from a completion queue (CQ); determining whether an execution reply table of the CE comprises an unsecure value; if so, reallocating a physical address for a user data transaction corresponding to the unsecure value; and outputting a write command into a submission queue (SQ) for programming the user data transaction into the reallocated physical address.

18 Claims, 9 Drawing Sheets

(52) U.S. Cl.
CPC ...... *G06F 11/1048* (2013.01); *G06F 11/1068* (2013.01); *G06F 12/0246* (2013.01)

(56) References Cited

U.S. PATENT DOCUMENTS

2017/0091028 A1* 3/2017 Golan .................. G11C 29/028
2018/0011762 A1* 1/2018 Klein .................. G06F 11/1072

FOREIGN PATENT DOCUMENTS

| | | |
|---|---|---|
| TW | 201528269 A | 7/2015 |
| TW | 201530555 A | 8/2015 |
| TW | 201707002 A | 2/2017 |
| TW | 201719374 A | 2/2017 |
| TW | 201725589 A | 7/2017 |
| TW | 201732551 A | 9/2017 |

* cited by examiner

METHODS AND APPARATUSES FOR PROACTIVE ECC FAILURE HANDLING

CROSS-REFERENCE TO RELATED APPLICATIONS

This application claims the benefit of priority to U.S. Provisional Application Ser. No. 62/563,115, filed on Sep. 26, 2017; and Patent Application No. 107109044, filed in Taiwan on Mar. 16, 2018; the entirety of which is incorporated herein by reference for all purposes.

BACKGROUND

The disclosure generally relates to flash memory and, more particularly, to methods and apparatuses for proactive error-correcting code (ECC) failure handling.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. Actually, NAND flash devices usually read or program several pages of data from or into memory cells. In reality, the NAND flash device always reads from the memory cells and writes to the memory cells complete pages. After a page of data is read from the array into a buffer inside the device, the host can access the data bytes or words one by one by serially clocking them out using a strobe signal.

An open-channel Solid State Drive (SSD) system includes a SSD (a device) and a host and does not have a flash translation layer implemented on the device, but instead leaves the management of the physical solid-state storage to the host. Open-Channel SSDs differ from a traditional SSD in that they expose the internal parallelism of the Open-Channel SSD to the host and allow the host to manage it accordingly. The Open-Channel SSD is equipped with an encoder for generating the ECC according to data that the host attempts to write, and programs the data and the ECC into a storage unit together. Furthermore, the Open-Channel SSD is equipped with an error-correcting circuit for fixing, without any participation by the host, error bits occurred in read data by using the ECC. However, with increased accesses to the storage unit, a quantity of error bits of the stored data goes up. Since the trend of error-bits occurred in read data is unknown by the host, the host is incapable of instructing the Open-Channel SSD to perform a data movement to move data that is frequently accessed to a location that is less accessed.

Thus, it is desirable to have methods and apparatuses for proactive ECC failure handling to overcome the aforementioned constraints.

SUMMARY

In view of the foregoing, it may be appreciated that a substantial need exists for methods and apparatuses that mitigate or reduce the problems above.

In an aspect of the invention, the invention introduces a method for proactive error-correcting code (ECC) failure handling, at least including: obtaining a completion element (CE) from a completion queue (CQ); determining whether an execution reply table of the CE comprises an unsecure value; if so, reallocating a physical address for a user data transaction corresponding to the unsecure value; and outputting a write command into a submission queue (SQ) for programming the user data transaction into the reallocated physical address.

In another aspect of the invention, the invention introduces a method for proactive ECC failure handling, at least including: receiving a parameter setting command; setting an error-bit threshold according to the parameter setting command; receiving a read command; reading a user data transaction from a source address according to the read command; when an amount of error bits occurred in the user data transaction is equal to or greater than the error-bit threshold, setting a bit of an execution reply table associated with the user data transaction to an unsecure value; and writing a CE comprising the execution reply table into a CQ.

In still another aspect of the invention, the invention introduces an apparatus for proactive ECC failure handling, at least including an access interface and a processing unit. The processing unit, coupled to a host and the access interface, receives a parameter setting command from the host; sets an error-bit threshold according to the parameter setting command; receives a read command from the host; reads a user data transaction from a source address of the storage unit through the access interface according to the read command; when an amount of error bits occurred in the user data transaction is equal to or greater than the error-bit threshold, sets a bit of an execution reply table associated with the user data transaction to an unsecure value; and writing a CE comprising the execution reply table into a CQ.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings.

The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
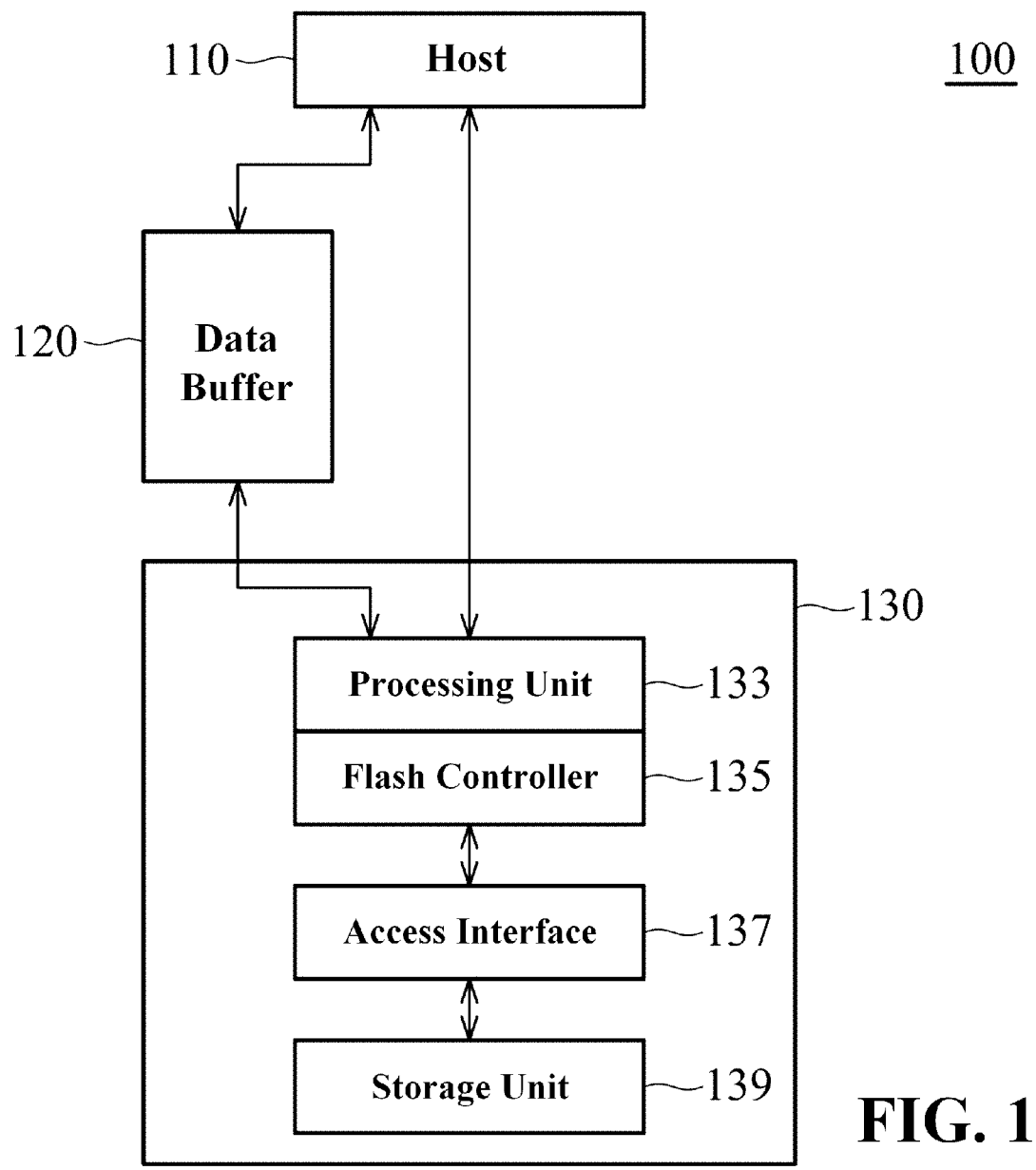
FIG. 1 is the architecture of a Solid State Drive (SSD) system according to an embodiment of the invention.

Refer to FIG. 1. The SSD system 100 includes a host 110, a data buffer 120 and a SSD 130. The host 111 may create a queue, a storage mapping table (may also be referred to as a Logical-To-Physical L2P table) and usage records under the necessity of an operation. The system architecture may be practiced in a personal computer (PC), a laptop PC, a tablet computer, a mobile phone, a digital camera, a digital recorder, or other electronic consumer products. The data buffer 120, the queue and the storage mapping table may be practiced in particular regions of a Random Access Memory (RAM). The host 110 may communicate with the Open-Channel SSD 130 through the Open-Channel SSD Non-Volatile Memory express (NVMe) interface (protocol). The host 110 can be implemented in numerous ways, such as with general-purpose hardware that is programmed to perform the functions recited herein. The host 210 may contain at least an Arithmetic Logic Unit (ALU) and a bit shifter. The ALU is multifunctional device that can perform both arithmetic and logic function. The Open-Channel SSD NVMe specification, for example, version 1.2 published in April, 2016, supports multiple I/O channels and each I/O channel is related to Logical Unit Numbers (LUNs) to correspond to respective storage sub-units of the storage unit 139. In the Open-Channel SSD NVMe specification, the host 110 integrates with a Flash Translation Layer (FTL) that had once been implemented on a device to optimize the workload. The conventional FTL maps Logical Block Addresses (LBAs) recognized by the host or a file system to physical addresses of the storage unit 139 (also called logical-to-physical mappings). In the Open-Channel SSD NVMe specification, the host 110 may instruct the Open-Channel SSD 130 to store user data in a physical address of the storage unit 139. Thus, the host 110 is responsible for maintaining the storage mapping table to record which physical address of the storage unit 139 that the user data of each LBA is actually stored.

The Open-Channel SSD 130 at least includes a processing unit 133. The processing unit 133 may communicate with the host 110 following the Open-Channel SSD NVMe protocol for receiving data access commands including physical addresses and instruct a flash controller 135 to perform erases, data reads or writes according to the data access commands.

The Open-Channel SSD 130 may contain the flash controller 135, an access interface and the storage unit 139 and the flash controller 135 may communicate with the storage unit 139 using a Double Data Rate (DDR) protocol, such as Open NAND Flash Interface (ONFI), DDR toggle, or others. Specifically, the flash controller 135 of the Open-Channel SSD 130 writes user data into a designated address (a destination address) of the storage unit 139 and reads user data from a designated address (a source address) thereof through the access interface 137. The access interface 137 may issue control signals, such as Chip Enable (CE), Address Latch Enable (ALE), Command Latch Enable (CLE), Write Enable (WE), etc. for coordinating command and data transfer between the flash controller 135 and the storage unit 139. The processing unit 133 and the flash controller 135 may be implemented in separate chips or integrated with a single chip.

The flash controller 135 contains an ECC encoder and an ECC decoder. In a data programming, the ECC encoder uses an encoder algorithm to generate ECC according to data sent from the host 110 and program the host data and the ECC (hereinafter collectively referred to as user data) into the storage unit 139. In a data read, the ECC decoder uses a corresponding decoder algorithm to check the accuracy of the user data read from the storage unit 139 and attempts to correct error bits (if any) of the read data. If the user data is correct, the flash controller 139 may drop the ECC directly and reply to the host 110 with the original data through the processing unit 133. If the user data includes error bits that have been recovered by the ECC decoder, the flash controller 135 may drop the recovered ECC and reply to the host 110 with recovered data through the processing unit 133. If there are too many error bits to recover, the flash controller 135 may reply to the host 110 with a data-read error message through the processing unit 133. The ECC may be Low-Density Parity Check Code (LDPC), Bose-Chaudhuri-Hocquenghem (BCH) code, or others. Regularly, LDPC provides better correction capability than BCH. For 1 KB user data as an example, BCH can recover at most 76 error bits while LDPC can recover at most 120 error bits.

In a system boot, the host 110 may obtain relevant operation parameters, such as total numbers of blocks, bad blocks and I/O channels, a latency or others, under the necessity of an operation.

Figure 2:
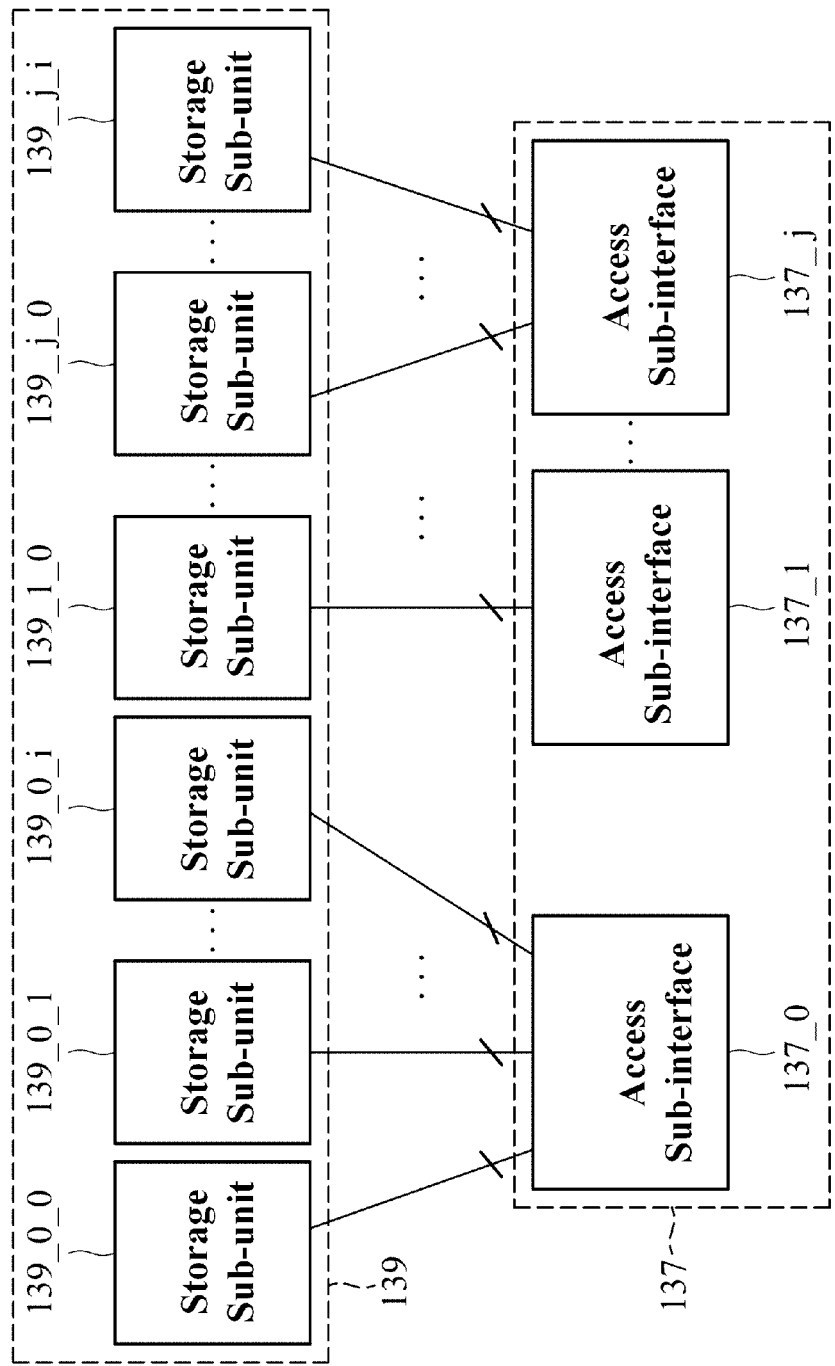
FIG. 2 is a schematic diagram illustrating interfaces to storage units of a flash storage according to an embodiment of the invention.
Figure 3:
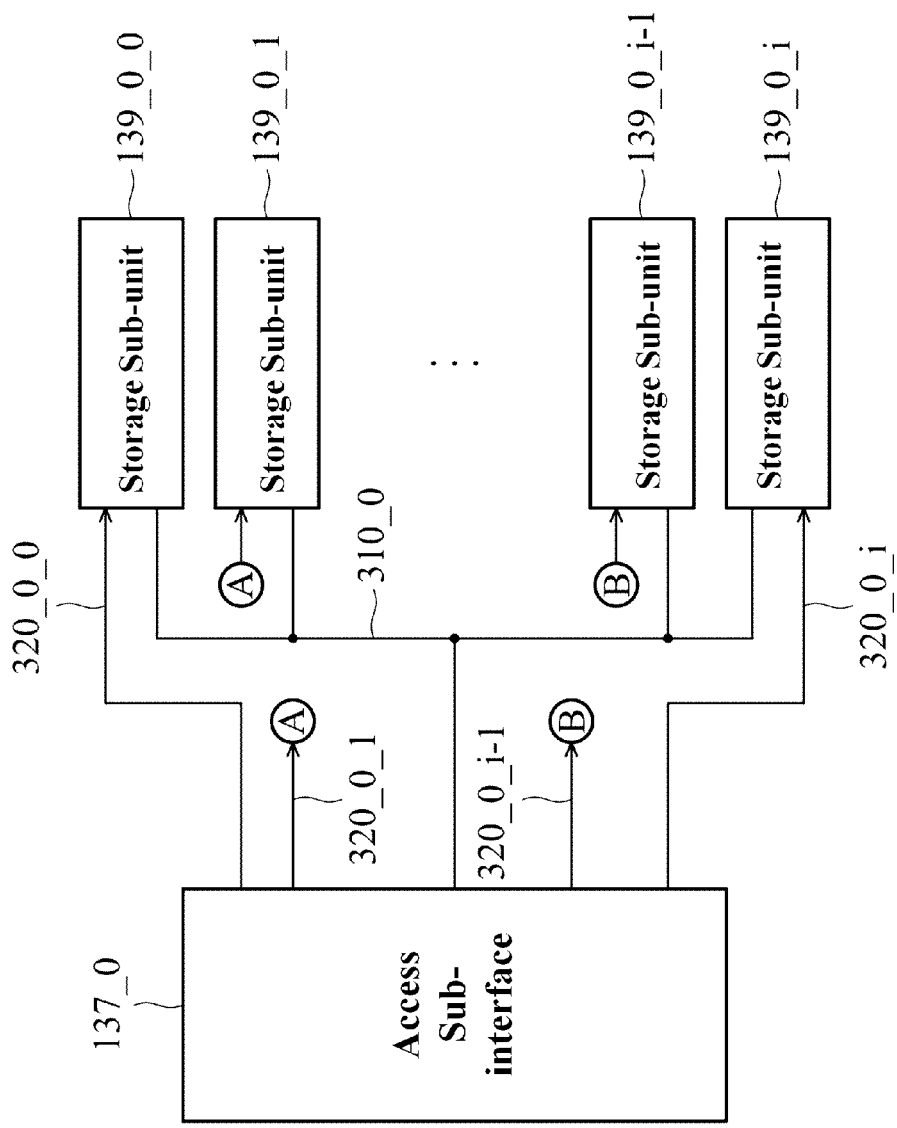
FIG. 3 is a schematic diagram depicting connections between one access sub-interface and multiple storage sub-units according to an embodiment of the invention.

The storage unit 139 may contain multiple storage sub-units and each storage sub-unit may use a respective access sub-interface to communicate with the flash controller 135. One or more storage sub-units may be packaged in a single die. Refer to FIG. 2. The flash memory may contain j+1 access sub-interfaces 137_0 to 137_j and each access sub-interface may connect to i+1 storage sub-units. Each access sub-interface and the connected storage sub-units behind may be referred to as a I/O channel collectively. That is, i+1 storage sub-units may share the same access sub-interface. For example, assume that the Open-Channel SSD 130 contains 4 I/O channels (j=3) and each I/O channel connects to 4 storage sub-units (i=3): The Open-Channel SSD 130 has 16 storage sub-units 139_0_0 to 139_j_i in total. The flash controller 135 may drive one of the access sub-interfaces 137_0 to 137_j to read data from the designated storage sub-unit. Each storage sub-unit has an independent CE control signal. That is, it is required to enable a corresponding CE control signal when attempting to perform data read or programming from or into a designated storage sub-unit via an associated access sub-interface. It is apparent that any number of I/O channels may be provided in the Open-Channel SSD 130, and each I/O channel may include any number of storage sub-units, and the invention should not be limited thereto. Refer to FIG. 3. The flash controller 135, through the access sub-interface 137_0, may use independent CE control signals 320_0_0 to 320_0_i to select one of the connected storage sub-units 139_0_0 and 139_0_i, and then read data from or program data into the designated location of the selected storage sub-unit via the shared data line 310_0.

Figure 4:
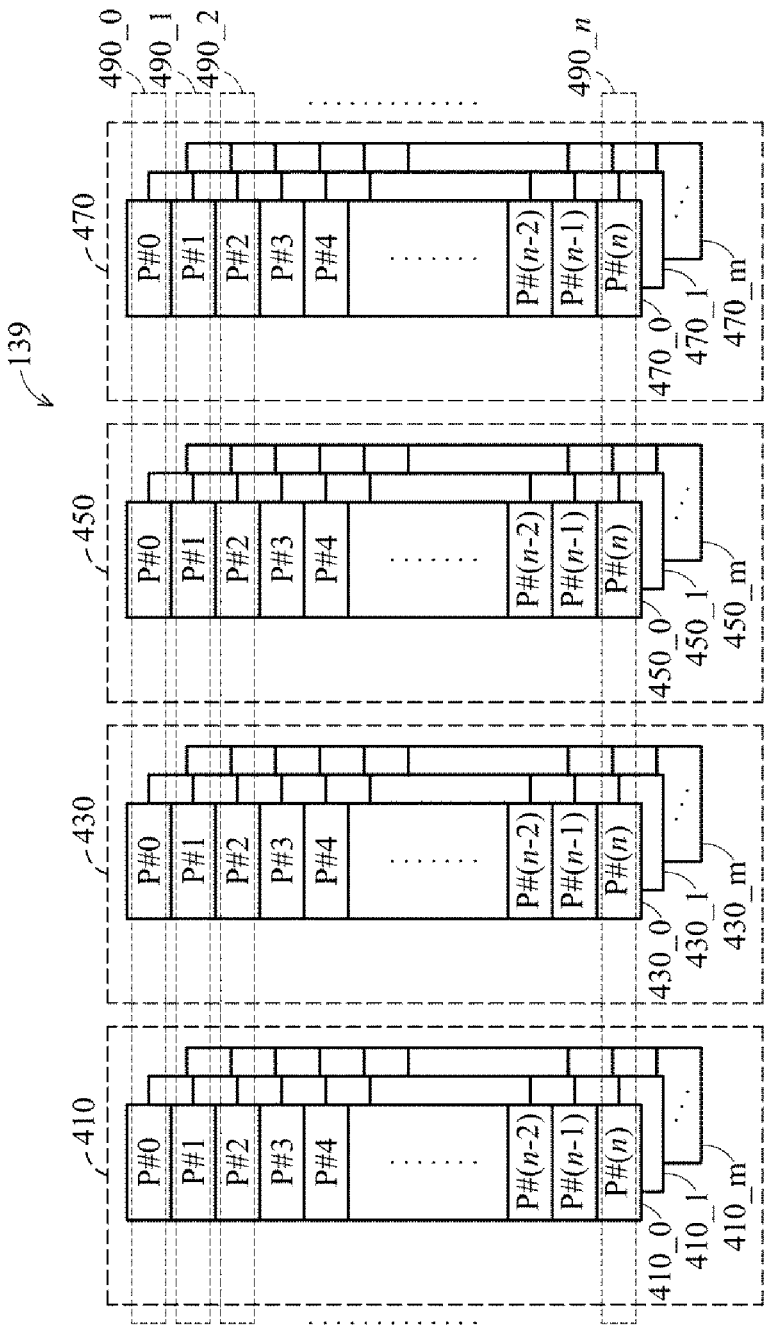
FIG. 4 is a schematic diagram of a storage unit.

Refer to FIG. 4. The storage unit 139 may include multiple data planes 410_0 to 410_m, 430_0 to 430_m, 450_0 to 450_m and 470_0 to 470_m and each data plane or multiple data planes may be set to one LUN. The data planes 410_0 to 410_m and the shared access sub-interface are called the I/O channel 410, the data planes 430_0 to 430_m and the shared access sub-interface are called the I/O channel 430, the data planes 450_0 to 450_m and the shared access sub-interface are called the I/O channel 450, and the data planes 470_0 to 470_m and the shared access sub-interface are called the I/O channel 470, collectively, in which m may be a power of two 2^n, such as 1, 2, 4, 8, 16, 32, etc., the I/O channels 410, 430, 450 and 470 may be identified by LUNs. Each of the data planes 410_0 to 470_m may include multiple physical blocks, each physical block may include multiple pages P#0 to P#(n) and each page may include multiple sectors, such as 4, 8 sectors, or more, where n may be set to 767, 1535, or others. Each page may include multiple NAND memory cells and the NAND memory cells may be Single-Level Cells (SLCs), Multi-Level Cells (MLCs), Triple-Level Cells (TLCs) or Quad-Level Cells (QLCs). In some embodiments, when each NAND memory cell is SLC capable of recording two states, the pages P#0 of the data planes 410_0 to 470_0 may virtually form a super page 490_0, the pages P#1 of the data planes 410_0 to 470_0 may virtually form a super page 490_1, and so on. In alternative embodiments, when each NAND memory cell is MLC capable of recording four states, one physical wordline may include pages P#0 (referred to as Most Significant Bit MSB pages) and pages P#1 (referred to as Least Significant Bit LSB pages), and the rest may be deduced by analogy. In further alternative embodiments, when each NAND memory cell is TLC capable of recording eight states, one physical wordline may include pages P#0 (MSB pages), pages P#1 (referred to as Center Significant Bit CSB pages) and pages P#2 (LSB pages), and the rest may be deduced by analogy. In further alternative embodiments, when each NAND memory cell is QLC capable of recording sixteen states, one physical wordline may include MSB, CSB, LSB and Top Significant Bit (TSB) pages.

When the storage unit 139 operates, a page may be the minimum data unit, such as 16 KB, that can be managed or programmed, and the physical address may be represented by a page number. Alternatively, each page may include multiple sectors and the length of each sector may be, for example, 4 KB. A sector may be the minimum data unit that can be managed, and the physical address may be represented by a sector number or an offset that this sector is located in a page. A block is the minimum unit for erasing data.

Physical blocks may be classified into active, data and spare blocks dependent on their usage statuses. An active block is a physical block where user data is programming, that is, in which the End of Block (EOB) information has not been programmed. A data block is a physical block in which user data and the EOB information have been programmed, that is, no user data can be programmed. A spare block can be selected as a candidate of active block and stores no valid user data. Typically, the spare block is erased to become an active block after being selected.

In some embodiments, the physical address that the host 110 sends to the Open-Channel SSD 130 may include information about a LUN, a data plane number, a physical block number, a physical page number and a sector number, etc. to indicate that the user data is to be read or programmed from or into a specified sector of a physical page of a physical block of a physical data plane of a I/O channel. Note that the sector number may be modified by a column number. In alternative embodiments, the physical address that the host 110 sends to the Open-Channel SSD 130 may include information about a LUN, a data plane number, a physical block number, etc. to indicate that a specified physical block of a physical data plane of a I/O channel is to be erased.

Figure 5:
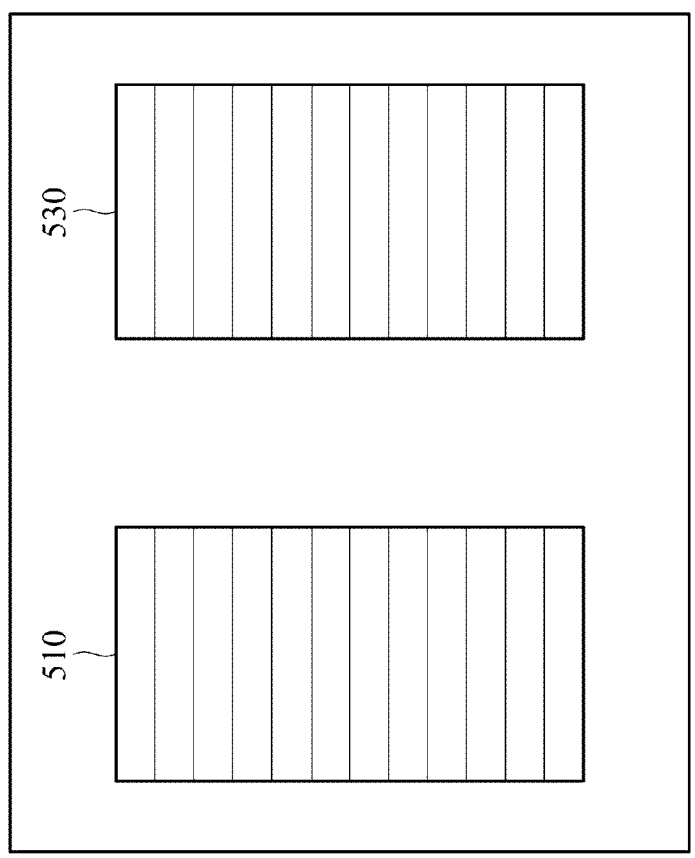
FIG. 5 is a schematic diagram of a command queue and a submission queue.

Refer to FIG. 5. A queue 115 may include a Submission Queue (SQ) 510 and a Completion Queue (CQ) 530 for temporarily storing host instructions and Completion Elements (CEs), respectively. Each of the SQ 510 and the CQ 530 contains a collection of entries. Each entry of the SQ 510 may store one host command, such as one I/O command (hereinafter referred to as a data access command) or one administration command.

Each entry of the CQ 530 stores one CE associated with one data access or administration command, where the functionality of the CE likes a confirmation message. The entries in the collection are kept in order. The principle operations on the collection are the addition of entities to the rear terminal position (or referred to as the tail), known as enqueue, and removal of entities from the front terminal position (or referred to as the head), known as dequeue, where the amount of entries that are enqueued or dequeued may be equal to or greater than 1. The first command or element added to the SQ 510 or the CQ 530 will be the first one to be removed. The host 110 may write data access commands, such as the erase, read, write commands, or others, into the SQ 510 and the processing unit 133 may read (or fetch) the earliest arrived data access command from the SQ 510 to execute. After an execution of the data access command completes, the processing unit 133 may write a CE into the CQ 350 and the host 110 may read (or fetch) the CE to determine an execution result of the associated data access command.

Figure 6:
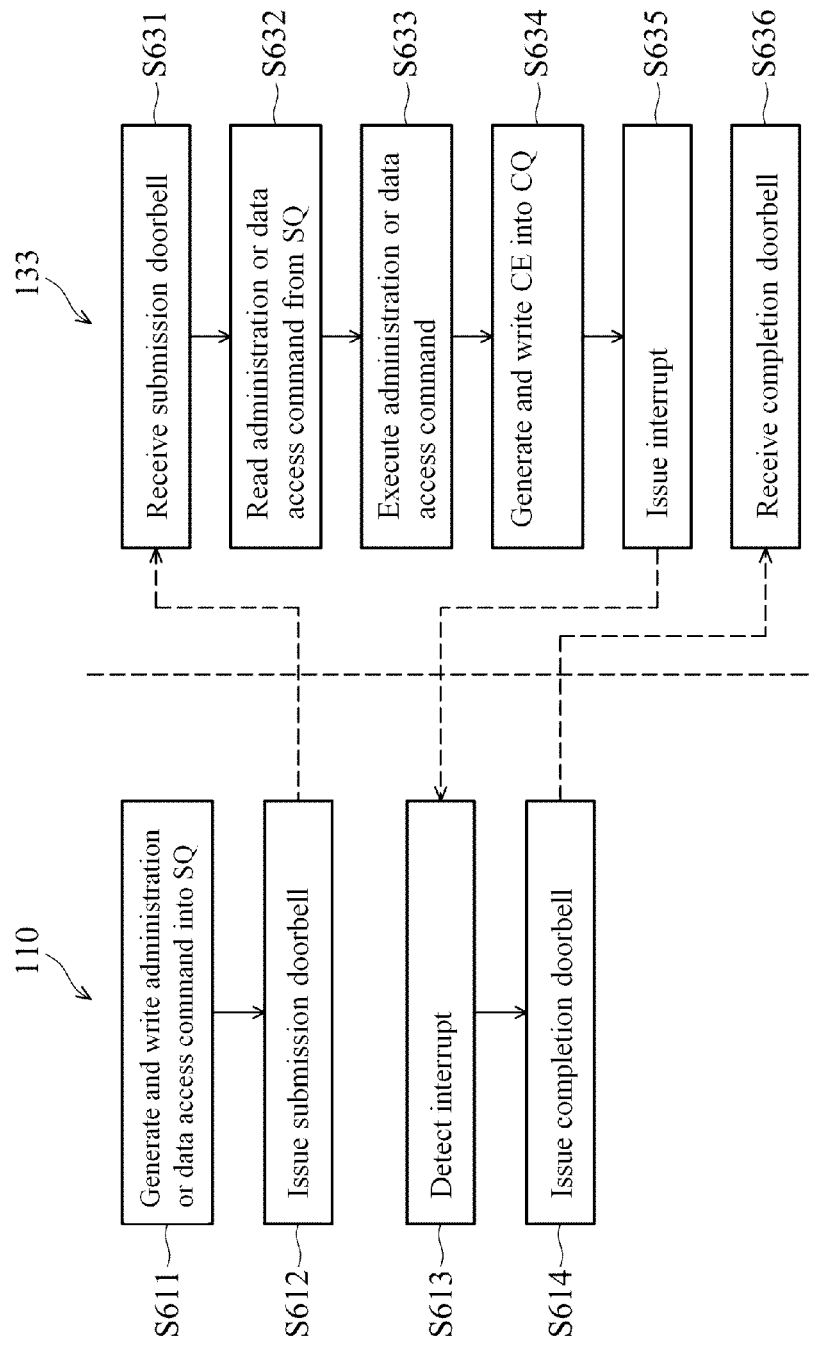
FIG. 6 is a flowchart illustrating a method for executing an administration or data access command according to an embodiment of the invention.

Refer to FIG. 6. The host 110 may generate and write an administration or data access command into the SQ 510 (step S611), in which contains information about a physical address. The physical address includes a source or destination address to point to a physical location of the storage unit 139 or the data buffer 120, such as a particular block, page or sector address etc., rather than an LBA. Then, the host 110 may issue a submission doorbell to the processing unit 133 (step S612) to inform the processing unit 133 that an administration or data access command has been written into the SQ 510, and update the value (pointer) pointing to the tail of the SQ 510. Note that steps S611 and S612 may be referred to as an operation for issuing, by the host 110, an administration or data access command to the Open-Channel SSD 130. After receiving the submission doorbell (step S631), the processing unit 133 may read the administration or data access command from the head of the SQ 510 (step S632) and drive the flash controller 135 to perform a designated operation (such as a device recognition, a parameter setting, a block erase, a data read, a data write, etc.) according to the administration or data access command (step S633). Note that steps S631 and S632 may be referred to as an operation for receiving, by the Open-Channel SSD 130, an administration or data access command from the host 110.

After the designated operation has been performed completed, the processing unit 133 may generate and write a CE into the CQ 530 (step S634) to inform the host 110 of information about an execution status for the operation associated with the administration or data access command, and issue an interrupt to the host 110 (step S635). After detecting the interrupt (step S613), the host 110 may read the CE from the head of the CQ 530 (step S613), and then, issue a completion doorbell to the processing unit 133 (step S614). After receiving the completion doorbell (step S636), the processing unit 133 may update the value pointing to the head of the CQ 530. Note that steps S634 and S635 may be referred to as an operation for replying, by the Open-Channel SSD 130, with a result for executing an administration or data access command to the host 110. Note that steps S613 and S614 may be referred to as an operation for receiving, by the host 110, a result for executing an administration or data access command from the Open-Channel SSD 130.

In steps S612 and S614, the host 110 may set corresponding registers to issue the submission and completion doorbells to the processing unit 133.

One data access command may be issued for processing multiple (for example, 64) transactions of user data. The CE may include an execution reply table of multiple (for example, 64) bits and each bit may indicate an execution result of one corresponding transaction of user data. For example, "0" indicates a success while "1" indicates a failure. The data access command may include an opcode field for storing the type (such as a block erase, a data read, a data write, etc.) of the data access command. The CE may include a status field for storing an execution status (such as a success, a failure, etc.) of a corresponding data access command. Moreover, since the processing unit 133 may execute the data access commands out-of-order or according to their priorities, the data access commands and the CEs may include command identifier fields, allowing the host 110 to associate each CE with a designated data access command.

For example, since a spare block has to be erased first to become an active block before a data write, the host 110 may write an erase command into the SQ 510 (step S611) to direct the Open-Channel SSD 130 (specifically, the processing unit 133) to perform an erase operation on a designated spare block of a designated I/O channel. The processing unit 133 may drive the flash controller 135 to perform the designated erase operation in the storage unit 139 through the access interface 137 to deal with the erase command (step S633). After the erase operation is completed, the processing unit 133 may write a CE into the CQ 530 (step S634) to inform the host 110 that the corresponding erase operation has been performed completely.

For example, the host 110 may write a read command into the SQ 510 (step S611) to direct the Open-Channel SSD 130 to read a user data transaction from (a designated sector of) a designated physical page of a designated physical block of a designated data plane of a designated I/O channel. The processing unit 133, in dealing with the read command, may drive the flash controller 135 to read a user data transaction from a designated physical address of the storage unit 139 through the access interface 137, and store the user data transaction in a region of a data buffer 120 specified in the read command (step S633). After the read operation is completed, the processing unit 133 may write a CE into the CQ 530 (step S634) to inform the host 110 that the corresponding read operation has been performed completely.

For example, the host 110 may store a user data transaction to be programmed in a region of the data buffer 120 and write a write command into the SQ 510 (step S611) to direct the Open-Channel SSD 130 to program the user data transaction into (a designated sector of) a designated physical page. The write command includes information about a destination address (a physical address) pointing to (a designated sector of) a designated physical page, and a source address (a physical address) of the user data transaction. The processing unit 133, in dealing with the write command, may read the user data transaction to be programmed from the source address of the data buffer 120 and drive the flash controller 135 to program the user data transaction through the access interface 137 into the destination address of the storage unit 139 that is indicated in the write command (step S633). After the write operation is completed, the processing unit 133 may write a CE into the CQ 530 (step S634) to inform the host 110 that the corresponding write operation has been performed completely.

Although FIG. 5 shows two queues 510 and 530, those artisans may separate the SQ 510 into an administration SQ and an I/O SQ for temporarily storing the administration commands and the data access commands taken from the host 110, respectively, and separate the CQ 530 into an administration CQ and an I/O CQ for storing CEs associated with the administration commands and the data access commands, respectively.

Data retention of a physical block becomes weaker as an increased number of erase times of the physical block, resulting in more error bits of user data of the physical block. Since the ECC decoder checks and corrects the error bits occurred in the user data automatically, the host 110 cannot know the degree of increased error bits of a physical page, and therefore, the host 110 cannot perform a proper error prevention. The Open-Channel SSD 130 replies to the host 110 with a data-read error message when the ECC decoder fails to correct error bits occurred in user data. The host 110 can only activate advanced data-correction mechanism, such as a Redundant Array of Independent Disks (RAID) recovery, etc. to recover the user data. However, the RAID recovery consumes excessive computation resource and time of the host 110 and the Open-Channel SSD 130, and excessive transmission bandwidth between the host 110 and the Open-Channel SSD 130. To address the aforementioned drawbacks, embodiments of the invention introduce error-prevention mechanism to lower the probability or frequency of the data-read errors.

Generally, to achieve the purpose of the invention, the error-prevention mechanism may acquire and set operating parameters of the Open-Channel SSD 130, which include an error-bit threshold, and then, perform a method for proactive ECC failure handling with the set operating parameters.

Figure 7:
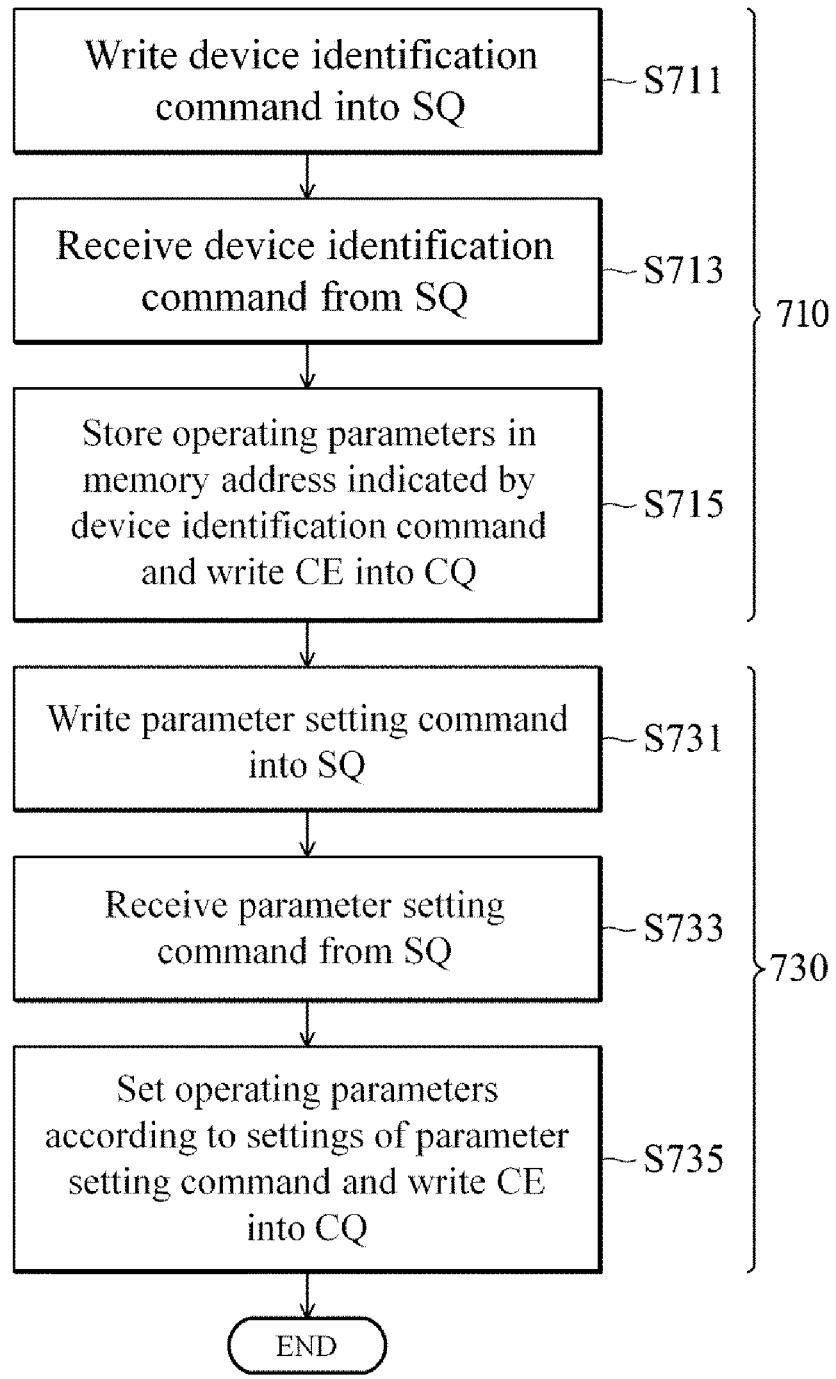
FIG. 7 is a flowchart illustrating a method for acquiring and setting device parameters of a flash memory device according to an embodiment of the invention.

Refer to FIG. 7. The whole process includes a device identification phase 710 and a parameter setting phase 730. The device identification phase 710 includes steps S711 to S715. The host 110 writes a device identification command into the SQ 510 (step S711). The device identification command is used to request the Open-Channel SSD 130 (specifically, the processing unit 133) for providing operating parameters including: a block number, a bad-block number, a latency, an amount of I/O channels, an indicator indicating whether to enable each or any ECC type, the maximum capability for each or any ECC type (for example, in error bits over a data length), etc., and as well an error-bit threshold (for example, in error bits over a data length). The Open-Channel SSD 130 receives the device identification command from the SQ 510 (step S713). After a reception of the device identification command, the Open-Channel SSD 130 stores operating parameters in a memory address indicated by the device identification command, and then, writes a CE corresponding to the device identification command into the CQ 530 (step S715).

The parameter setting phase 730 includes steps S731 to S735. The host 110 may set the operating parameters acquired from the Open-Channel SSD 130, such as enabling an ECC, setting a value of the error-bit threshold, for example 100, where the set value of the error-bit threshold is less than the maximum capability of the enabled ECC, for example 120. After that, the host 110 stores the aforementioned settings in a parameter setting command and writes the parameter setting command into the SQ 510 (step S571). The Open-Channel SSD 130 receives the parameter setting command from the SQ 510 (step S733). After acquiring the parameter setting command, the Open-Channel SSD 130 sets the operating parameters according to the settings of the parameter setting command, such as enabling an ECC and setting the error-bit threshold to 100. After the operating parameters have been set according to the valid settings of the parameter setting command, the Open-Channel SSD 130 writes a CE associated with the parameter setting command into the CQ 530 (step S735).

Figure 8:
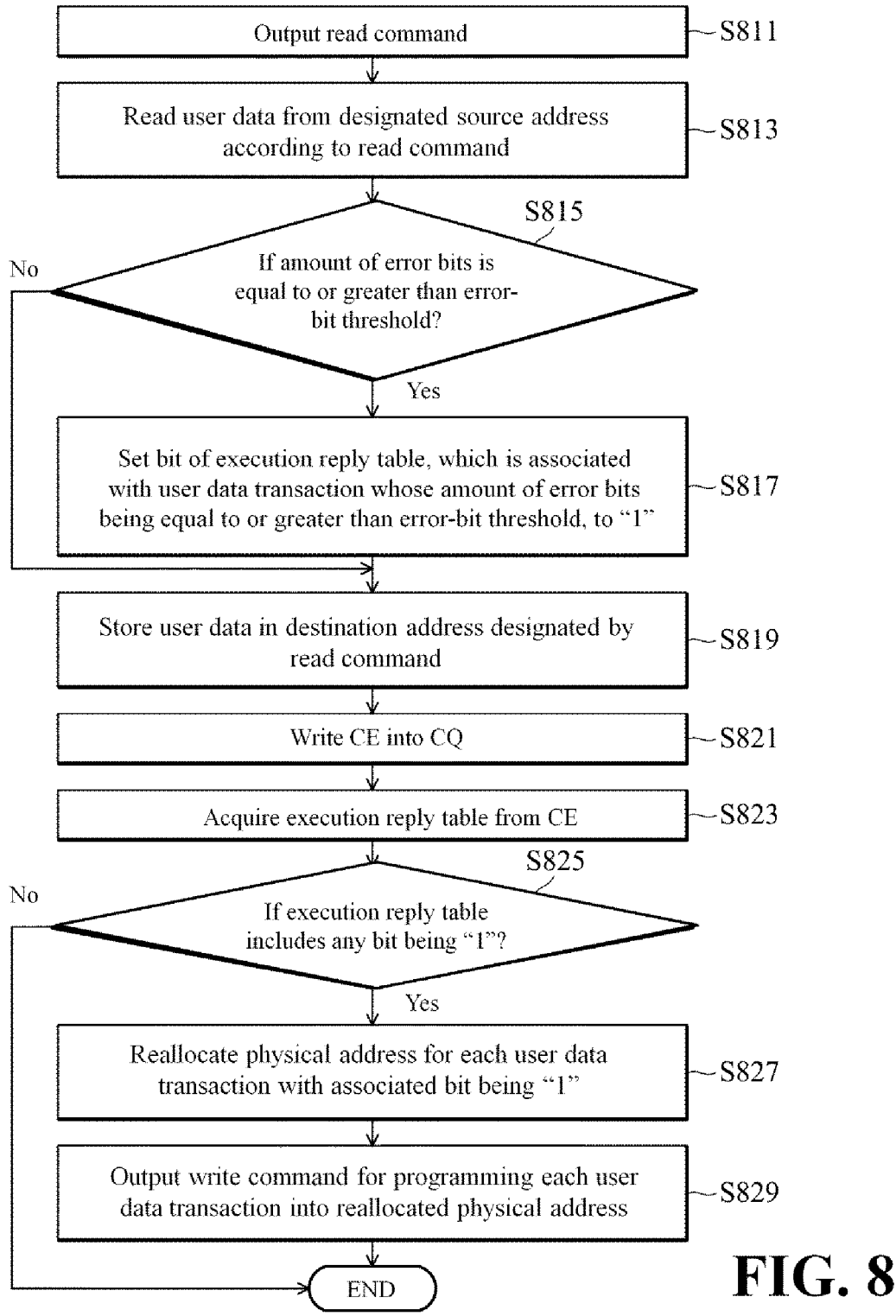
FIG. 8 is a flowchart illustrating a method for proactive ECC handling, performed by a host, according to an embodiment of the invention.

After the error-bit threshold has been set, the host 110 activates an embodiment of the method for proactive ECC handling. Refer to FIG. 8. The host 110 outputs a read command to the Open-Channel SSD 130 (step S811). Detailed operations for outputting the read command may refer to descriptions of steps S611 to S612.

Then, the Open-Channel SSD 130 reads a user data transaction from a designated source address (a physical address) according to the read command (step S813). Details of step S813 may refer to the descriptions of steps S631 to S633. After acquiring the user data transaction, the ECC decoder of the Open-Channel SSD 130 checks and corrects error bits occurred in the read user data transaction automatically and calculates an amount of the error bits.

Then, the flash controller 135 of the Open-Channel SSD 130 determines whether the calculated amount of the error bits is equal to or greater than the error-bit threshold (step S815). If so (the "Yes" path of step S815), a bit of an execution reply table, which is associated with the user data transaction whose amount of the error bits being equal to or greater than the error-bit threshold, is set to "1" (step S817). Assume that one read command requests for reading 64 transactions of user data: Each bit of the execution reply table may indicate whether the amount of the error bits occurred in the corresponding user data transaction is equal to or greater than the error-bit threshold. If not, the bit is set to "0", i.e. a secure value, to indicate that the user data transaction is correctly stored. If so, the bit is set to "1", i.e. an unsecure value, to indicate that the stored user data transaction may have damage risks.

Then, the Open-Channel SSD 130 stores the user data in a destination address designated by the read command (step S819). The designated address may preferably be a physical address of the data buffer 120. Then, the Open-Channel SSD 130 writes a CE into the CQ 530 (step S821).

Then, the host 110 acquires an execution reply table from the CE of the CQ 530 (step S823), and determines whether the execution reply table includes any bit being "1" (step S825). If not, the process ends.

Then, the host 110 reallocates a physical address for each user data transaction with the associated bit being "1" of the execution reply table (step S827). The reallocated physical address belongs to an active block.

Then, the host 110 outputs a write command to the Open-Channel SSD 130 for programming each user data transaction with the associated bit being "1" of the execution reply table into the reallocated physical address (step S829). The operations for outputting the write command may refer to the descriptions of steps S611 to S612.

Figure 9:
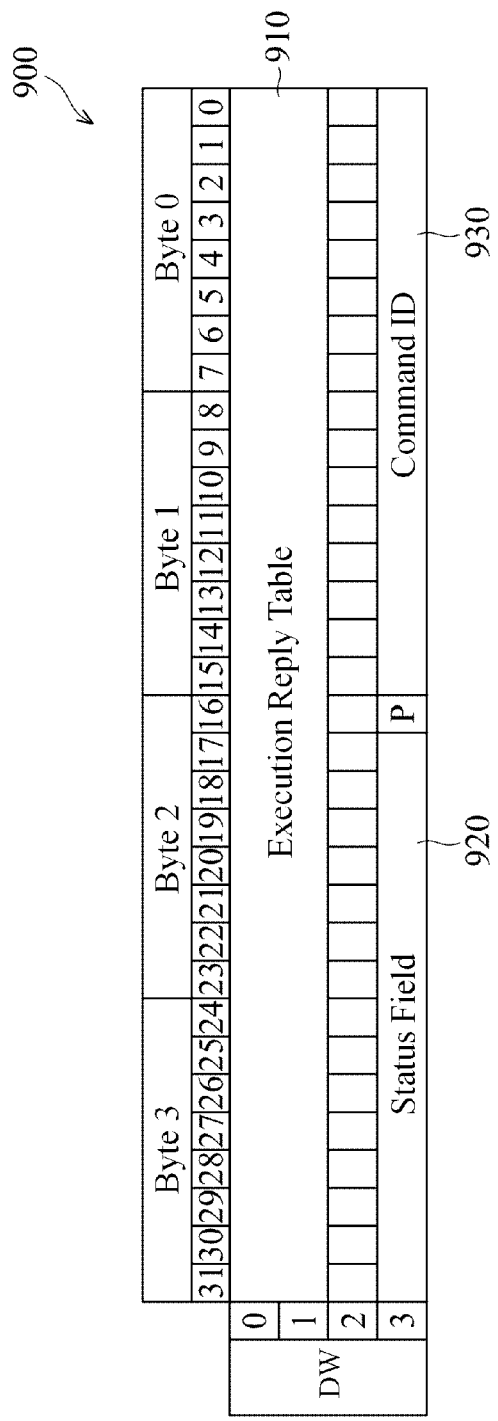
FIG. 9 shows the data format of a Completion Element (CE).

FIG. 9 shows the data format of a CE. The CE 900 may be a 16-Byte message. The $0^{th}$ to $1^{st}$ bytes of the $3^{rd}$ double word (DW) of the CE 900 may record a command ID 930 and the content should be consistent with a command ID of a host read command to make the CE 900 to be associated with the corresponding read command 1000 issued by the host 110. The $0^{th}$ to $1^{st}$ DWs of the CE 1100 may store an execution reply table 910 of 64 bits and each bit may record an execution result by step S817 for each transaction of user data, for example, indicating whether the amount of the error bits occurred in the user data transaction is equal to or greater than the error-bit threshold. The $17^{th}$ to 31th bits of the $3^{rd}$ DW store a status field 920 for recording an execution status indicating whether the read command issued by the host 110 has been executed successfully.

The error-bit threshold may be set may using the following equation:

$$Tr = \text{MAX}i \times \alpha \quad (1)$$

where Tr represents the error-bit threshold, MAXi represents the maximum error-correction capability of a particular ECC (in correctable error bits/a data length), i is an integer, α is a coefficient between 0 and 1, more specifically, $0.6 \leq \alpha \leq 1$. For example, when MAXi is set to 120 bits per 1 KB and α is initiated to 0.8, the error-bit threshold Tr is initiated to 96. When 64 user data transactions are successfully read, the status field of the CE indicates a success and all bits of the execution reply table of the CE are "0".

Warning messages returned from the Open-Channel SSD 130 becomes more frequent as an increased number of erase times and the aging storage unit 139. For example, with which 64 user data transactions are read, the status field of the CE indicates a success but the execution reply table of the CE has 32 bits being "1", that is, each of 32 user data transactions has error bits being greater than 96. Therefore, the host 110 may set a to a greater value, for example, set α to 0.9 from 0.8 and the error-bit threshold becomes 108 to avoid unnecessary data movements in reflection of the increased erase times and the device aging. The host 110 may change the error-bit threshold to 108 and stores the new one in a parameter setting command and issue the parameter setting command to the Open-Channel SSD 130 to make the Open-Channel SSD 130 reset the error-bit threshold to 108, resulting in a reduced number of "1" of the execution reply table. Thereafter, the host 110 reallocates a physical address for each user data transaction with the corresponding bit being "1". Since the reallocated physical address is within an active block and the active block has typically been erased less (that is, has better data retention), the aforementioned drawbacks can be addressed.

Some or all of the aforementioned embodiments of the method of the invention may be implemented in a computer program such as an operating system for a computer, a driver for a dedicated hardware of a computer, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

The computer program may be advantageously stored on computation equipment, such as a computer, a notebook computer, a tablet PC, a mobile phone, a digital camera, a consumer electronic equipment, or others, such that the user of the computation equipment benefits from the aforementioned embodiments of methods implemented by the computer program when running on the computation equipment. Such the computation equipment may be connected to peripheral devices for registering user actions such as a computer mouse, a keyboard, a touch-sensitive screen or pad and so on.

Although the embodiment has been described as having specific elements in FIGS. 1 to 3, it should be noted that additional elements may be included to achieve better performance without departing from the spirit of the invention. While the process flows described in FIGS. 7 and 8 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for proactive error-correcting code (ECC) failure handling, performed by a host, comprising:
    obtaining a completion element (CE) corresponding to a read command from a completion queue (CQ), wherein the read command is issued to request a storage device to read a user data transaction from a source address, and the CE is written into the CQ by the storage device and comprises an execution result of the read command;
    determining whether an execution reply table of the CE comprises an unsecure value, wherein the unsecure value is generated by the storage device;
    if so, reallocating a physical address for the user data transaction corresponding to the unsecure value in the CE; and
    outputting a write command into a submission queue (SQ) for directing the storage device to program the user data transaction into the reallocated physical address,
    wherein the host creates the CQ and the SQ.

2. The method of claim 1, wherein the storage device obtains the write command from the SQ and writes the CE into the CQ.

3. The method of claim 2, wherein the physical address is located in the storage device.

4. The method of claim 1, comprising:
    outputting the read command to the storage device to read the user data transaction.

5. The method of claim 1, comprising:
    outputting a parameter setting command to the storage device to set a error-bit threshold.

6. The method of claim 5, wherein the error-bit threshold is less than a maximum capability for an ECC type of the storage device.

7. The method of claim 1, comprising:
    outputting a device identification command to the storage device to obtain at least one operating parameter of the storage device.

8. A method for proactive error-correcting code (ECC) failure handling, performed by a storage device, comprising:
    receiving a parameter setting command from a host;
    setting an error-bit threshold according to the parameter setting command;
    receiving a read command from the host, wherein the read command requests to read a user data transaction from a source address;
    reading the user data transaction from the source address according to the read command;
    when an amount of error bits occurred in the user data transaction is equal to or greater than the error-bit threshold, setting a bit of an execution reply table associated with the user data transaction to an unsecure value; and
    writing a completion element (CE) comprising the execution reply table into a completion queue (CQ) created by the host, thereby enabling the host to reallocate a physical address for the user data transaction whose amount of error bits occurred is equal to or greater than the error-bit threshold.

9. The method of claim 8, comprising:
    when the amount of error bits occurred in the user data transaction is less than the error-bit threshold, setting the bit of the execution reply table associated with the user data transaction to a secure value.

10. The method of claim 8, comprising:
    enabling an ECC according to the parameter setting command.

11. The method of claim 8, wherein the parameter setting command and the read command are received by an Open-Channel solid state drive (SSD).

12. The method of claim 11, wherein the error-bit threshold is less than a maximum capability for an ECC type of the Open-Channel SSD.

13. The method of claim 8, wherein the parameter setting command is stored in a submission queue (SQ).

14. The method of claim 8, comprising:
    storing the user data transaction into a destination address indicated by the read command.

15. An apparatus for proactive error-correcting code (ECC) failure handling, installed in a storage device, comprising:
    an access interface, coupled to a storage unit; and
    a processing unit, coupled to a host and the access interface, receiving a parameter setting command from the host; setting an error-bit threshold according to the parameter setting command;
    receiving a read command from the host, wherein the read command requests to read a user data transaction from a source address; reading the user data transaction from the source address of the storage unit through the access interface according to the read command; when an amount of error bits occurred in the user data transaction is equal to or greater than the error-bit threshold, setting a bit of an execution reply table associated with the user data transaction to an unsecure value; and
    writing a completion element (CE) comprising the execution reply table into a completion queue (CQ) created by the host, thereby enabling the host to reallocate a physical address for the user data transaction whose amount of error bits occurred is equal to or greater than the error-bit threshold.

16. The apparatus of claim 15, wherein the processing unit sets the bit of the execution reply table associated with the user data transaction to a secure value when the amount of error bits occurred in the user data transaction is less than the error-bit threshold.

17. The apparatus of claim 15, wherein the processing unit enables an ECC according to the parameter setting command.

18. The apparatus of claim 15, wherein the error-bit threshold is less than a maximum capability for an ECC type of the Open-Channel SSD.

* * * * *